United States Patent
Li et al.

(10) Patent No.: US 8,817,673 B2
(45) Date of Patent: Aug. 26, 2014

(54) METHOD AND AN APPARATUS FOR ALLOCATING AN ACK/NACK CHANNEL

(75) Inventors: Yingyang Li, Beijing (CN); Chengjun Sun, Beijing (CN); Xiaoqiang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 13/291,361

(22) Filed: Nov. 8, 2011

(65) Prior Publication Data

US 2012/0113876 A1 May 10, 2012

(30) Foreign Application Priority Data

Nov. 8, 2010 (CN) .......................... 2010 1 0539638
Aug. 15, 2011 (CN) .......................... 2011 1 0234916

(51) Int. Cl.
 *H04J 1/16* (2006.01)
 *H04L 5/00* (2006.01)
 *H04W 72/04* (2009.01)
(52) U.S. Cl.
 CPC .................................. *H04L 5/0055* (2013.01)
 USPC ............ 370/278; 370/252; 370/329; 370/430
(58) Field of Classification Search
 CPC ................................................... H04L 5/0055
 USPC .................................. 370/252, 278, 329, 430
 See application file for complete search history.

(56) References Cited

U.S. PATENT DOCUMENTS

| | | | |
|---|---|---|---|
| 2011/0235599 A1* | 9/2011 | Nam et al. ................... | 370/329 |
| 2012/0099546 A1* | 4/2012 | Cho et al. ..................... | 370/329 |
| 2012/0294252 A1* | 11/2012 | Kwon et al. ................. | 370/329 |
| 2013/0176982 A1* | 7/2013 | Han et al. .................... | 370/329 |

OTHER PUBLICATIONS

Pantech, "PUCCH resource allocation with TxD for channel selection", 3GPP TSG RAN WG1 Meeting #62bis, R1-105301, Oct. 11-15, 2010.
LG Electronics, "ACK/NACK resource allocation for FDD", 3GPP TSG RAN WG1 Meeting #62bis, R1-105339, Oct. 11-15, 2010.
Research in Motion, "PUCCH resource allocation for channel selection with TxD diversity", 3GPP TSG RAN WG1 Meeting #62bis, R1-105511, Oct. 11-15, 2010.
LG Electronics, "Transmit Diversity for PUCCH Channel Selection", 3GPP TSG RAN WG1 Meeting #62bis, R1-105665, Oct. 11-15, 2010.

* cited by examiner

*Primary Examiner* — John Pezzlo
(74) *Attorney, Agent, or Firm* — Jefferson IP Law, LLP

(57) ABSTRACT

A method for allocating an Acknowledgement/Negative Acknowledgement (ACK/NACK) channel by a Base Station (BS) in a Frequency Division Duplexing (FDD) system is provided. The method includes allocating downlink resources in one or more cells to a User Equipment (UE), transmitting, Physical Downlink Control Channel (PDCCH) information and downlink data using the downlink resources, allocating at least four ACK/NACK channels to the UE, receiving ACK/NACK information for the PDCCH information and the downlink data fed back by using two antennas from the UE, and performing re-transmission or transmitting new data according to the ACK/NACK information, wherein at least two of the at least four ACK/NACK channels are the same as at least two ACK/NACK channels allocated by the BS in a mode not using a Spatial Orthogonal Resource Transmit Diversity (SORTD) scheme, and the at least two of the at least four ACK/NACK channels are allocated to different antennas.

36 Claims, 4 Drawing Sheets

---

301 when SORTD is adopted, allocating 4 ACK/NACK channels for a Pcell adopting MIMO, denoting the 4 channels as CH_1, CH_2, CH_3 and CH_4, the CH_1 and the CH_2 correspond to two ACK/NACK channels allocated to the cell when SORTD is not adopted

↓

302 each antenna uses two ACK/NACK channels, and the CH_1 and the CH_2 are used by different antennas

METHOD AND AN APPARATUS FOR ALLOCATING AN ACK/NACK CHANNEL

PRIORITY

This application claims the benefit under 35 U.S.C. §119 (a) of a Chinese patent application filed in the Chinese Patent Office on Nov. 8, 2010 and assigned Serial No. 201010539638.4, and on Aug. 15, 2011 and assigned Serial No. 201110234916.x, the entire disclosures of which are hereby incorporated by reference.

BACKGROUND OF THE INVENTION

1. Field of the Invention

The present invention relates to wireless communication systems. More particularly, the present invention relates to a method and an apparatus for allocating an Acknowledgement/Negative Acknowledgement (ACK/NACK) channel.

2. Description of the Related Art

Long Term Evolution (LTE) systems of the related art have a maximum bandwidth of 20 MHz which cannot meet the requirements for higher data transmission rates. LTE-Advanced (LTE-A) is brought forward based on LTE to increase transmission rates of users. In LTE-A systems, multiple Component Carriers (CC) are aggregated to generate a larger working bandwidth for both downlink and uplink of the communication systems, thus a higher transmission rate can be provided. This technique is referred to as Carrier Aggregation (CA). For example, 5 CCs of 20 MHz may be aggregated to provide a bandwidth of 100 MHz. Each CC is referred to as a cell.

Among multiple downlink Cells configured in a Base Station (BS), one Cell is a Primary cell (Pcell), and other Cells are referred to as a Secondary cells (Scell).

The BS may configure a User Equipment (UE) to receive downlink data from multiple Cells by utilizing high layer signaling, but the actual number of Cells dynamically scheduled within a sub-frame may be smaller than or equal to that of the Cells configured by the high layer signaling. Herein examples are described below with reference to FIGS. 1 and 2.

FIG. 1 is a schematic diagram illustrating a BS scheduling a Cell according to the related art.

Referring to FIG. 1, four Cells are configured via high layer signaling, denoted as Cell 1 to Cell 4. However, the BS schedules only one Cell, i.e., Cell 1.

FIG. 2 is a schematic diagram illustrating a BS scheduling three Cells according to the related art.

Referring to FIG. 2, four Cells are configured via high layer signaling, denoted as Cell 1 to Cell 4. However, the BS schedules only three of them, i.e., Cell 1, Cell 2 and Cell 3.

Data transmission in a downlink Cell may be scheduled using Physical Downlink Control Channels (PDCCHs) transmitted in other Cells, and this manner is referred to as cross carrier scheduling. Alternatively, the data transmission in a downlink Cell may be scheduled using the PDCCH transmitted in the downlink Cell, and this manner is referred to as non cross carrier scheduling.

The CA technique enables a BS to transmit downlink data via multiple Cells at the same time to the same UE, and correspondingly, the UE should support feeding back Acknowledgement/Negative Acknowledgement (ACK/NACK) information for the downlink data transmitted in the multiple Cells. According to discussions about LTE-A, the ACK/NACK information for data transmission in the multiple Cells are transmitted in an uplink Cell (i.e., the uplink Pcell). LTE-A may adopt manners supporting channel selection for transmitting ACK/NACK information of up to 4 bits to support ACK/NACK information of multiple bits, and this has been adopted in LTE Time Division Duplexing (TDD) systems. When channel selection of a single antenna is taken into consideration, the number of ACK/NACKs that should be allocated is equal to the number of bits of the ACK/NACK to be fed back. That is, when the number of ACK/NACK information is M, the number of ACK/NACK channels to be allocated is M. Since each ACK/NACK channel has four available Quadrature Phase Shift Keying (QPSK) constellation points, there are 4M channels and constellation point resources, and proper channels and constellation point resources may be selected from the 4M resources for feeding back information of M bits.

According to discussions about LTE-A, channel selection in LTE-A Frequency Division Duplexing (FDD) systems only supports up to two Cells, and each Cell can be used for feeding back ACK/NACK information of 1 or 2 bits. When methods of Spatial Orthogonal Resource Transmit Diversity (SORTD) are not adopted for transmission diversity, the manner of ACK/NACK channel resource allocation includes, for the downlink Pcell, determining the ACK/NACK channel for feeding back ACK/NACK information of the Pcell by utilizing the index of a Control Channel Element (CCE) of the PDCCH in an implicit manner. For a downlink Scell, when cross carrier scheduling is not adopted or cross carrier scheduling is adopted using PDCCH of another Scell, the ACK/NACK channel for feeding back ACK/NACK information of the Scell is determined by ACK/NACK Resource Indication (ARI) in the PDCCH scheduling of the Scell. When cross carrier scheduling for a downlink Scell by utilizing the PDCCH of the Pcell, the ACK/NACK channel for feeding back ACK/NACK information of the Scell is determined by utilizing the index of a CCE of the PDCCH in an implicit manner. When a mode of transmitting a Cell is configured to be Single-Input Multiple-Output (SIMO), one ACK/NACK channel should be allocated because only one piece of ACK/NACK information for one Transmission Block (TB) of the Cell should be fed back. Accordingly, when the mode of transmitting a Cell is configured to be Multiple-Input Multiple-Output (MIMO), two ACK/NACK channels should be allocated because two pieces of ACK/NACK information for two TBs of the Cell should to be fed back. When the ACK/NACK channel is allocated in an implicit manner, the ACK/NACK channel for feeding back ACK/NACK information for one Cell is obtained from the PDCCH scheduling data transmission of the Cell. Specifically, denoting the smallest CCE index of the PDCCH as n, when only one ACK/NACK channel should be allocated, the ACK/NACK channel can be obtained by mapping of the CCE index n; when two ACK/NACK channels should be allocated, the two ACK/NACK channels can be obtained by mapping of the CCE index n and n+1.

According to discussions, backward compatibility with LTE systems is taken into consideration when mapping tables for channel selection in FDD systems are defined. Table 1 is an exemplary four-bit mapping table for channel selection when SORTD is not adopted in the related art. In Table 1, "A" denotes that ACK/NACK information received by a UE from the Scell or the Pcell is an ACK; "N" denotes that the ACK/NACK information received by the UE from the Scell or the Pcell is a NACK; "D" denotes that no data is received by the UE from the Scell or the Pcell; and "1", "−1", "j" and "−j" respectively denote positions of QPSK constellation points of channels selected. "ch_a", "ch_b", "ch_c", "ch_d" denote four ACK/NACK channels allocated, with ch_a and ch_b being the two ACK/NACK channels for the Pcell, and ch_c and ch_d being the two ACK/NACK channels for the Scell. Specifically, when the UE only receives data from the Pcell or the ACK/NACK information received by the UE from the Scell is a NACK, the UE utilizes the first ACK/NACK channel of the Pcell (i.e., ch_a) for feeding back ACK/NACK information. When Pcell adopts MIMO, Physical Uplink Control CHannel (PUCCH) format 1b is adopted for mapping constellation points to ch_a; when Pcell adopts CC Single-Input Multiple-Output (SIMO), PUCCH format 1a is adopted for mapping constellation points to ch_a. When the UE only receives data from the Scell or the ACK/NACK information received by the UE from the Scell Pcell are NACKs, the UE uses the second ACK/NACK channel of the Scell (i.e., ch_d) for feeding back ACK/NACK information. This manner of feeding back ACK/NACK information is the same with that adopted in LTE.

TABLE 1

| | | ACK/NACK channel | | | |
|---|---|---|---|---|---|
| Pcell | Scell | ch_a | ch_b | ch_c | ch_d |
| A, A | A, A | | | −1 | |
| A, N | A, A | | | −j | |
| N, A | A, A | | | −j | |
| N, N | A, A | | | | −1 |
| A, A | A, N | | j | | |
| A, N | A, N | | 1 | | |
| N, A | A, N | | 1 | | |
| N, N | A, N | | | | j |
| A, A | N, A | | | −1 | |
| A, N | N, A | | | j | |
| N, A | N, A | | | | −j |
| N, N | N, A | | | | 1 |
| A, A | N, N | −1 | | | |
| A, N | N, N | j | | | |
| N, A | N, N | −j | | | |
| N, N | N, N | 1 | | | |
| A, A | D, D | −1 | | | |
| A, N | D, D | j | | | |
| N, A | D, D | −j | | | |
| N, N | D, D | 1 | | | |
| D, D | A, A | | | | −1 |
| D, D | A, N | | | | j |
| D, D | N, A | | | | 1 |
| D, D | N, N | | | no transmission | |
| D, D | D, D | | | no transmission | |

In addition, according to discussions, a UE configured with only one Cell adopts SORTD for transmit diversity. More specifically, the UE is allocated with two ACK/NACK channels, and two transmitting antennas transmit the same ACK/NACK information in different channels respectively. The receiving party receives signals from the two channels and performs Maximum Ratio Combining (MRC) to obtain optimal diversity effects. The smallest CCE index of the PDCCH is denoted as n, and the two ACK/NACK channels may be obtained based on CCE index n and n+1 through implicit mapping of LTE. SORTD technique may also be adopted in the above method for feeding back ACK/NACK information of two CCs based on channel selection when transmit diversity should to be supported. The number of ACK/NACK channels used for feeding back M pieces of ACK/NACK information is 2M, where M is 2, 3 or 4. But there is no detailed solution in FDD systems and TDD systems as for how to allocate the 2M ACK/NACK channel resources.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for Acknowledgement/Negative Acknowledgement (ACK/NACK) channel resource allocation supporting channel selection to enable ACK/NACK channel resource allocation for a User Equipment (UE) when channel selection and Spatial Orthogonal Resource Transmit Diversity (SORTD) is supported.

In accordance with an aspect of the present invention, a method for allocating an ACK/NACK channel by a Base Station (BS) in a Frequency Division Duplexing (FDD) system is provided. The method includes, if a channel selection mode using a SORTD scheme as a mode for ACK/NACK information feedback of a UE is set, and the UE use a Multiple-Input Multiple-Output (MIMO) communication scheme, allocating downlink resources in one or more cells to the UE, transmitting, to the UE, Physical Downlink Control Channel (PDCCH) information and downlink data using the downlink resources, allocating at least four ACK/NACK channels to the UE, receiving ACK/NACK information for the PDCCH information and the downlink data fed back by using two antennas from the UE, via the at least four ACK/NACK channels, and performing re-transmission or transmitting new data according to the ACK/NACK information, wherein at least two of the at least four ACK/NACK channels are the same as at least two ACK/NACK channels allocated by the BS in a mode not using the SORTD scheme, and the at least two of the at least four ACK/NACK channels are allocated to different antennas.

In accordance with another aspect of the present invention, a method for allocating an ACK/NACK channel by a BS in a Time Division Duplexing (TDD) system is provided. The method includes, if a channel selection mode using a SORTD scheme as a mode for ACK/NACK information feedback of a UE is set, allocating downlink resources in one or multiple cells to the UE, transmitting, to the UE, PDCCH information and downlink data using the downlink resources, allocating at least two ACK/NACK channels to the UE, and receiving ACK/NACK information fed back from the UE via the at least two ACK/NACK channels, and performing re-transmission or transmitting new data according to the ACK/NACK information, wherein a first ACK/NACK channel of the at least two ACK/NACK channels is one of an ACK/NACK channel identified by a smallest Control Channel Element (CCE) index of the PDCCH of the UE, and an ACK/NACK channel semi-statically configured by a high layer for feeding back the ACK/NACK information via the first antenna, and wherein a second ACK/NACK channel of the at least two ACK/NACK channels is one of an ACK/NACK channel identified by a second smallest CCE of the PDCCH of the UE, and an ACK/NACK channel semi-statically configured by the high layer for feeding back the ACK/NACK information via the second antenna.

In accordance with another aspect of the present invention, a method for transmitting ACK/NACK information by a UE in a FDD system is provided. The method includes, if a channel selection mode using a SORTD scheme as a mode for ACK/NACK information feedback of a UE is set, and the UE use a MIMO communication scheme, receiving an allocation of downlink resources in one or more cells from a BS, receiving PDCCH information and downlink data from the BS using the downlink resources, receiving an allocation of at least four ACK/NACK channels from the BS, and transmitting, to the BS, the ACK/NACK information for the PDCCH information and the downlink data by using two antennas via the at least four ACK/NACK channels, wherein at least two of the at least four ACK/NACK channels are the same as at least two ACK/NACK channels allocated by the BS in a mode not using the SORTD scheme, and the at least two of the at least four ACK/NACK channels are allocated to different antennas.

In accordance with another aspect of the present invention, a method for transmitting ACK/NACK information by a UE in a TDD system is provided. The method includes, if a channel selection mode using a SORTD scheme as a mode for ACK/NACK information feedback of a UE is set, receiving an allocation of downlink resources in one or multiple cells from a BS, receiving, from the BS, PDCCH information and downlink data using the downlink resources, receiving an allocation of at least two ACK/NACK channels from the BS, and transmitting ACK/NACK information to the BS via the at least two ACK/NACK channels, wherein a first ACK/NACK channel of the at least two ACK/NACK channels is one of an ACK/NACK channel identified by a smallest CCE index of the PDCCH of the UE, and an ACK/NACK channel semi-statically configured by a high layer for feeding back the ACK/NACK information via the first antenna, and wherein a second ACK/NACK channel of the at least two ACK/NACK channels is one of an ACK/NACK channel identified by a second smallest CCE index of the PDCCH via a second antenna of the UE, and an ACK/NACK channel semi-statically configured by the high layer for feeding back the ACK/NACK information via the second antenna.

In accordance with another aspect of the present invention, a BS for allocating an ACK/NACK channel in a FDD system is provided. The BS includes a transmitter, a receiver, and a controller, if a channel selection mode using a SORTD scheme as a mode for ACK/NACK information feedback of a UE is set and the UE use a MIMO communication scheme, for allocating downlink resources in one or more cells to the UE, for controlling the transmitter to transmit, to the UE, PDCCH information and downlink data using the downlink resources, for allocating at least four ACK/NACK channels to the UE, for controlling the receiver to receive ACK/NACK information for the PDCCH information and the downlink data fed back by using two antennas from the UE, via the at least four ACK/NACK channels, and for controlling the transmitter to re-transmit or transmit new data according to the ACK/NACK information, wherein at least two of the at least four ACK/NACK channels are the same as at least two ACK/NACK channels allocated by the BS in a mode not using the SORTD scheme, and the at least two of the at least four ACK/NACK channels are allocated to different antennas.

In accordance with another aspect of the present invention, a BS for allocating an ACK/NACK channel in a TDD system is provided. The BS includes a transmitter, a receiver, a controller, if a channel selection mode using a SORTD scheme as a mode for ACK/NACK information feedback of a UE is set, for allocating downlink resources in one or multiple cells to the UE, for controlling the transmitter to transmit, to the UE, PDCCH information and downlink data using the downlink resources, for allocating at least two ACK/NACK channels to the UE, and for controlling the receiver to receive ACK/NACK information fed back from the UE via the at least two ACK/NACK channels, and for controlling the transmitter to re-transmit or transmit new data according to the ACK/NACK information, wherein a first ACK/NACK channel of the at least two ACK/NACK channels is one of an ACK/NACK channel identified by a smallest CCE index of the PDCCH of the UE, and an ACK/NACK channel semi-statically configured by a high layer for feeding back the ACK/NACK information via the first antenna, and wherein a second ACK/NACK channel of the at least two ACK/NACK channels is one of an ACK/NACK channel identified by a second smallest CCE of the PDCCH of the UE, and an ACK/NACK channel semi-statically configured by the high layer for feeding back the ACK/NACK information via the second antenna.

In accordance with another aspect of the present invention, a UE for transmitting ACK/NACK information in a FDD system is provided. The UE includes a transmitter, a receiver, and a controller, if a channel selection mode using a SORTD scheme as a mode for ACK/NACK information feedback of a UE is set and the UE use a MIMO communication scheme, for controlling the receiver to receive an allocation of downlink resources in one or more cells from a BS, to receive PDCCH information and downlink data from the BS using the downlink resources and to receive an allocation of at least four ACK/NACK channels from the BS, and for controlling to the transmitter to transmit, to the BS, the ACK/NACK information for the PDCCH information and the downlink data by using two antennas via the at least four ACK/NACK channels, wherein at least two of the at least four ACK/NACK channels are the same as at least two ACK/NACK channels allocated by the BS in a mode not using the SORTD scheme, and the at least two of the at least four ACK/NACK channels are allocated to different antennas.

In accordance with another aspect of the present invention, a UE for transmitting ACK/NACK information in a TDD system is provided. The UE includes a transmitter, a receiver, and a controller, if a channel selection mode using a SORTD scheme as a mode for ACK/NACK information feedback of a UE is set, for controlling the receiver to receive an allocation of downlink resources in one or multiple cells from a BS, to receiving, from the BS, PDCCH information and downlink data using the downlink resources and to receive an allocation of at least two ACK/NACK channels from the BS, and for controlling the transmitter to transmit ACK/NACK information to the BS via the at least two ACK/NACK channels, wherein a first ACK/NACK channel of the at least two ACK/NACK channels is one of an ACK/NACK channel identified by a CCE index of the PDCCH of the UE, and an ACK/NACK channel semi-statically configured by a high layer for feeding back the ACK/NACK information via the first antenna, and wherein a second ACK/NACK channel of the at least two ACK/NACK channels is one of an ACK/NACK channel identified by a second smallest CCE index of the PDCCH via a second antenna of the UE, and an ACK/NACK channel semi-statically configured by the high layer for feeding back the ACK/NACK information via the second antenna.

In view of the foregoing, the method provided by exemplary embodiments of the present invention enable ACK/NACK channel resource allocation to a UE when channel selection and SORTD are supported. Furthermore, confusion of states can be avoided when the BS only schedules data of the Pcell.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
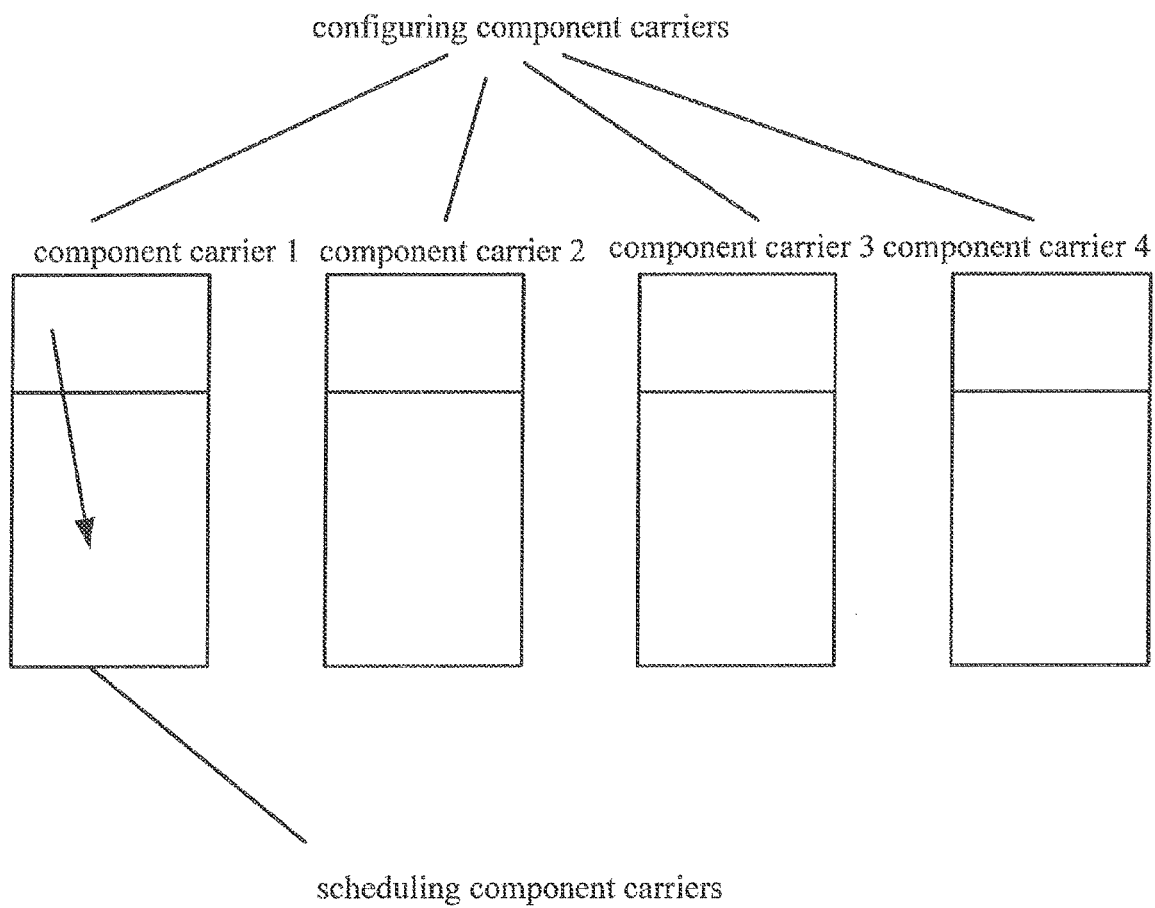
FIG. 1 is a schematic diagram illustrating a Base Station (BS) scheduling a Cell according to the related art.
Figure 2:
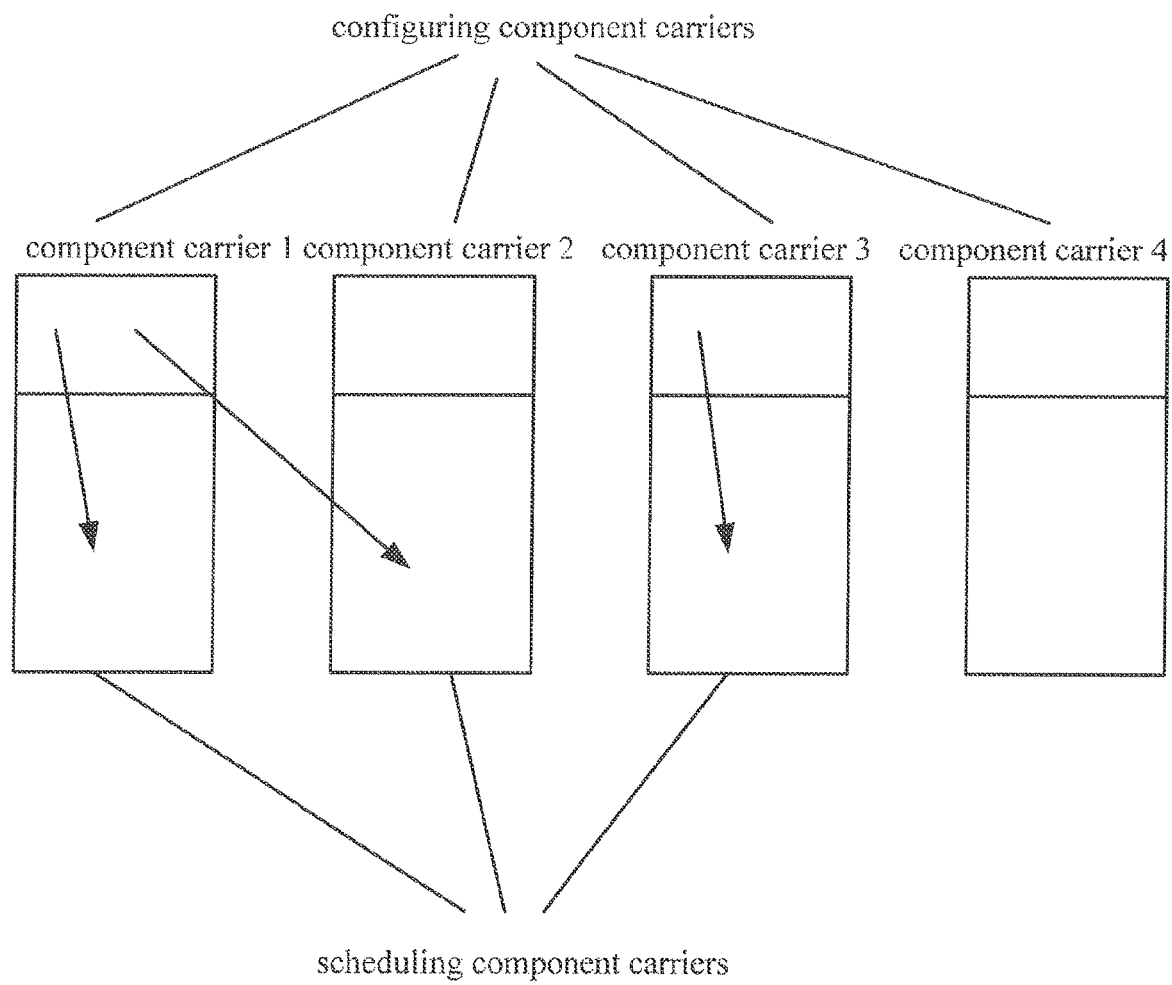
FIG. 2 is a schematic diagram illustrating a BS scheduling three Cells according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method for Acknowledgement/Negative acknowledgement (ACK/NACK) channel resource allocation when channel selection is adopted for ACK/NACK information transmission and Spatial Orthogonal Resource Transmit Diversity (SORTD) is adopted for transmit diversity. The method avoids confusion of states with situations when a User Equipment (UE) is configured with a single Cell and adopts SORTD for transmit diversity. Each of the two transmitting antennas mentioned in the following descriptions may be a physical transmit antenna or may be obtained by overlapping signals from multiple physical antennas. For example, for a UE configured with four physical antennas, each antenna may be implemented as two physical antennas to support two-antenna transmit diversity. In situations when SORTD is not adopted and the number of ACK/NACK information is M, the number of ACK/NACK channels that should be allocated is M. Accordingly, in situations when SORTD is adopted, the number of ACK/NACK channels that should be allocated is 2M, and the 2M ACK/NACK channels are divided into two groups. Each group includes M channels. Each_antenna selects one to-be-used channel from the M ACK/NACK channels of one group. To simplify system design, it is assumed that the two antennas adopt the same channel selection mapping table, and the channel selection mapping table is the same as that adopted when SORTD is not adopted.

For Frequency Division Duplexing (FDD) systems, the method for ACK/NACK channel resource allocation supporting channel selection of exemplary embodiments of the present invention may include the following procedures.

One procedure includes configuring, in the system, channel selection with SORTD as a mode for feeding back ACK/NACK information by a UE; allocating, by a Base Station (BS), downlink resources in one or multiple cells for the UE, and transmitting Physical Downlink Control Channel (PDCCH) information and downlink data via the downlink resources; receiving, by the UE, the PDCCH information and the downlink data, feeding back the ACK/NACK information to the BS based on the channel selection and SORTD; wherein, for a UE adopting Multiple-Input Multiple-Output (MIMO), the BS allocates four ACK/NACK channels which are respectively denoted as CHannel (CH)-1, CH_2, CH_3 and CH_4; CH-1 and CH_2 are same as the two ACK/NACK channels allocated by the BS for a cell when SORTD is not adopted, two antennas of the UE respectively utilize two of the four ACK/NACK channels for feeding back ACK/NACK information, and the CH_1 and the CH_2 are utilized by two different antennas; and receiving, by the BS, the ACK/NACK information fed back from the UE, performing re-transmission or transmitting new data according to the ACK/NACK information.

The following describes Primary cell (Pcell)-specific and Secondary cell (Scell)-specific methods for allocating ACK/NACK channels for each antenna when channel selection and SORTD transmit diversity are adopted.

Exemplary Embodiment 1:

This exemplary embodiment describes a method for allocating ACK/NACK channels for ACK/NACK information of a Pcell. State confusion should be avoided within an indefinite period of time for switching between a single Cell mode and a channel selection mode when a BS schedules data only on a Pcell.

When the Pcell is configured with a non-MIMO transmission mode, only one piece of ACK/NACK information for one Transmission Block (TB) should be fed back for a Pcell. When SORTD is supported, two ACK/NACK channels should be allocated for the one piece of ACK/NACK information. The two ACK/NACK channels may be obtained by scheduling PDCCH of data transmission in the Pcell. For example, assuming that the smallest Control Channel Element (CCE) index of PDCCH is denoted by n, the two ACK/NACK channels may be obtained by mapping the CCE index n and n+1. The two ACK/NACK channels are respectively used by two transmitting antennas. Denoting the two ACK/NACK channels as CH_1 and CH_2, and the ACK/NACK channel corresponding to the Pcell in a channel selection mapping table which does not adopt SORTD as ch_a, then ch_a of antenna 1 uses CH_1, ch_a of antenna 2 uses CH_2. Alternatively, ch_a of antenna 1 uses CH_2 and ch_a of antenna 2 uses CH_1. The two channel allocation manners are equivalent because the BS receives signals from the two antennas simultaneously. The two ACK/NACK channels allocated for the Pcell are the same with the two ACK/NACK channels allocated when the UE is configured with a single Cell and adopts SORTD transmit diversity, thus state confusion occurs when a UE only receives data from the Pcell or the ACK/NACK information received by the UE for an Scell are NACKs.

When the Pcell is configured with a MIMO transmission mode, denoting the two ACK/NACK channels corresponding to the Pcell in the channel selection mapping table adopting SORTD by ch_a and ch_b respectively, ACK/NACK information are transmitted using ch_a when the UE only receives data from the Pcell or the ACK/NACK information received by the UE for an Scell are NACKs. Denoting the smallest CCE index of the PDCCH as n, ch_a and ch_b are determined by the CCE index n and n+1 of the PDCCH which schedules data of the Pcell.

Figure 3:
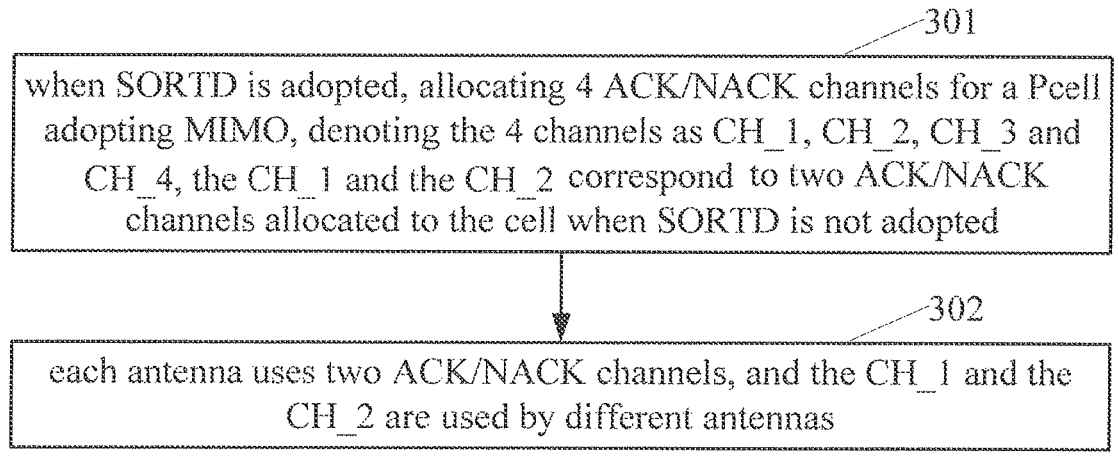
FIG. 3 illustrates a method for Acknowledgement/Negative acknowledgement (ACK/NACK) channel allocation for a Pcell according to an exemplary embodiment of the present invention.

When the Pcell is configured with the MIMO transmission mode and adopts SORTD, the method for ACK/NACK channel allocation shown in FIG. 3 may be adopted.

FIG. 3 illustrates a method for ACK/NACK channel allocation for a Pcell when SORTD is adopted according to an exemplary embodiment of the present invention.

Since two pieces of ACK/NACK information for two TBs of the Pcell are to be fed back, four ACK/NACK channels should be allocated for the two pieces of ACK/NACK information. Denoting the four channels as CH_1, CH_2, CH_3 and CH_4 respectively, CH_1 corresponds to the channel ch_a when channel selection is adopted and SORTD is not adopted. CH_2 corresponds to the channel ch_b when channel selection is adopted and SORTD is not adopted. The method may include the following procedures.

Referring to FIG. 3, in block 301, when SORTD is adopted, a Pcell adopting MIMO is allocated with four ACK/NACK channels, e.g., CH_1, CH_2, CH_3 and CH_4. The CH_1 corresponds to the ACK/NACK channel ch_a allocated to the Pcell when SORTD is not adopted. CH_2 corresponds to the ACK/NACK channel ch_b allocated to the Pcell when SORTD is not adopted.

In block 301, a first manner of allocating four ACK/NACK channels for the Pcell includes obtaining two of the ACK/NACK channels by a PDCCH scheduling data transmission in the Pcell. For example, denoting the smallest CCE index of the PDCCH as n, the two ACK/NACK channels may be obtained by mapping of CCE index n and n+1, i.e., the smallest CCE index and the second smallest CCE index, which are respectively denoted as CH_1 and CH_2. The other two ACK/NACK channels, denoted as CH_3 and CH_4, may be two ACK/NACK channels semi-statically configured by a high layer. Alternatively, the high layer may semi-statically configure multiple ACK/NACK channels, and the two ACK/NACK channels currently allocated to the UE may be indicated by ACK/NACK Resource Indication (ARI) information in the PDCCH scheduling data transmission of the Scell.

The second manner for allocating four ACK/NACK channels for the Pcell may include obtaining the four ACK/NACK channel from the PDCCH scheduling data transmission of the Pcell. For example, denoting the smallest CCE index of the PDCCH as n, the four ACK/NACK channels are obtained by mapping of CCE index n, n+1, n+2 and n+3, and are denoted as CH_1, CH_2, CH_3 and CH_4.

In addition, when Semi-Persistent Scheduling (SPS) service is configured in a sub-frame, a third manner of allocating four ACK/NACK channels for the Pcell may be adopted, which may include: denoting the four ACK/NACK channels as CH_1, CH_2, CH_3 and CH_4, the four channels may be semi-statically configured by the high layer; or two of the channels, e.g., CH_1 and CH_2, are semi-statically configured by the high layer, and the two ACK/NACK channels CH_3 and CH_4, which are dynamically indicated by ARI information in the PDCCH for scheduling data transmission of an Scell among multiple ACK/NACK channels semi-statically configured by the high layer. This manner may be adopted for allocating four candidate channels when the current sub-frame of the Pcell is for SPS services. The SPS represents a type of services whose physical channel resources are semi-statically configured and do not need to be dynamically scheduled by the PDCCH in downlink data transmission.

In block 302, each antenna utilizes two of the four ACK/NACK channels for feeding back ACK/NACK information, and CH_1 and CH_2 are respectively used by different antennas. In the channel selection mapping table which does not adopt SORTD, the two ACK/NACK channels for the Pcell are respectively denoted by ch_a and ch_b. In situations when the UE only receives data from the Pcell or the ACK/NACK information received by the UE from an Scell is a NACK, ch_a is adopted for transmitting ACK/NACK information.

In block 302, since two antennas respectively uses ACK/NACK channels decided by CCE index n and n+1 of the PDCCH (i.e., CH_1 and CH_2), i.e., antenna uses CH_1 and antenna 2 uses CH_2, when the UE is configured with only one Cell (i.e., the Pcell) and adopts SORTD for transmit diversity. When channel selection and SORTD are adopted, two antennas should be adopted to transmit ACK/NACK information in CH_1 and CH_2, i.e., antenna uses CH_1 and antenna 2 uses CH_2, in situations when the UE only schedules data in the Pcell and the ACK/NACK information received by the UE from an Scell are NACKs to avoid state confusion. Therefore, according to the above analysis, ch_a of antenna 1 uses CH_1, and ch_a of antenna 2 uses CH_2 when SORTD and channel selection are adopted because in situations when the UE only schedules data in the Pcell or the ACK/NACK information received by the UE from an Scell are NACKs, ch_a is used for transmitting ACK/NACK information in the channel selection mapping table which does not adopt SORTD. Alternatively, ch_a of antenna 1 uses CH_2 and ch_a of antenna 2 uses CH_1. The two channel allocation manners are substantially equivalent because the BS should receive signals from the two antennas simultaneously. In addition, ch_b of the two antennas respectively uses the other two allocated channels CH_3 and CH_4, e.g., ch_b of antenna 1 uses CH_3 and ch_b of antenna 2 uses CH_4.

In this exemplary embodiment, according to the first manner of allocating four ACK/NACK channels for the Pcell in block 301, in the channel selection mapping table which does not adopt SORTD, ACK/NACK information for data from Scell includes at least one ACK when ch_b is used for feeding back the ACK/NACK information, which means the UE has correctly received the PDCCH for scheduling the Scell, or the UE cannot correctly receive data from the Scell. Thus, the CH_3 and the CH_4 served as the ch_b for the Pcell may be allocated by the ARI in the PDCCH which schedules the Scell. Accordingly, when the BS does not transmit the PDCCH for scheduling the Scell or the UE does not receive the PDCCH and a PDSCH scheduling the Scell, there is no available ARI information in the PDCCH for scheduling the Scell. But according to the method of the present exemplary embodiment, the UE may only uses CH_1 and CH_2 for feeding back ACK/NACK information via the two antennas. Therefore, it is unnecessary to adopt the ARI for indicating the CH_3 and CH_4, so there is no problem in resource allocation.

Exemplary Embodiment 2:

This exemplary embodiment describes a method for allocating ACK/NACK channels for ACK/NACK information for an Scell.

When an Scell is configured with a non-MIMO transmission mode, one piece of ACK/NACK information for a TB should be fed back, and two ACK/NACK channels should be allocated. When cross carrier scheduling is not adopted, or the cross carrier scheduling is realized by using a PDCCH of another Scell, the two ACK/NACK channels may be semi-statically configured by a high layer, or, multiple ACK/NACK channels semi-statically configured by the high layer and the two ACK/NACK channels are dynamically specified by ARI information in the PDCCH. When cross carrier scheduling from PDCCH of the Pcell is performed, an implicit method may be adopted to specify the two ACK/NACK channels for ACK/NACK information of the Scell by a PDCCH. For example, denoting the smallest CCE index of the PDCCH as n, the two ACK/NACK channels may be obtained by mapping the CCE index n and n+1. Alternatively, one of the ACK/NACK channels is specified by using the implicit method via a PDCCH, and another of the ACK/NACK channels is semi-statically configured by a high layer. Alternatively, the ACK/NACK channel currently allocated to the UE may be dynamically indicated by ARI information in the PDCCH. Likewise, if the current sub-frame of the Scell is configured with an SPS service, the two ACK/NACK channels may be semi-statically configured by the high layer. The two ACK/NACK channels are respectively used by two antennas. Denoting the two ACK/NACK channels as CH_1 and CH_2, and the ACK/NACK channel corresponding to the Scell in a channel selection mapping table not adopting SORTD is ch_c, the ch_c of antenna 1 uses CH_1, and the ch_c of antenna 2 uses CH_2. Alternatively, the ch_c of antenna 1 uses CH_2 and the ch_c of antenna 2 uses CH_1. The two channel allocation manners are equivalent to each other because the BS should receive signals from the two antennas simultaneously.

When the Scell is configured with a MIMO transmission mode, the two ACK/NACK channels for the two pieces of ACK/NACK information of the Scell in the channel selection mapping table not adopting SORTD are denoted as ch_c and ch_d.

Figure 4:
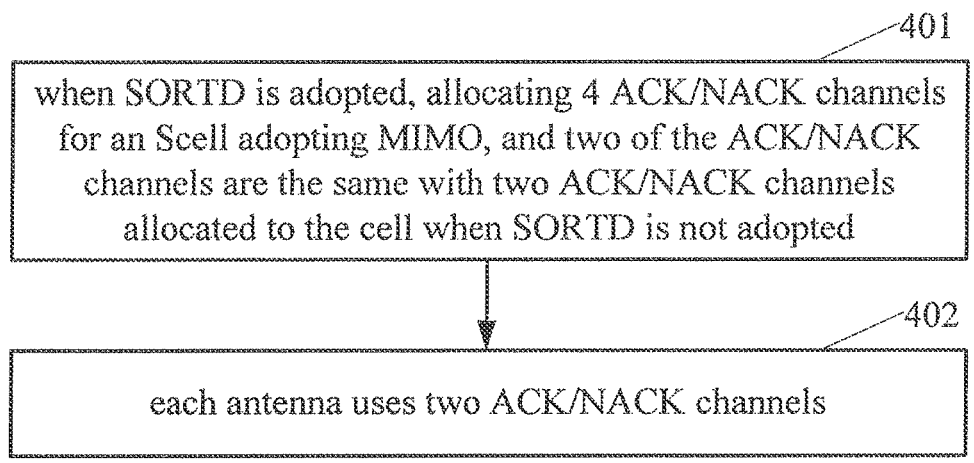
FIG. 4 illustrates a method for ACK/NACK channel allocation for an Scell according to an exemplary embodiment of the present invention.

FIG. 4 illustrates a method for ACK/NACK channel allocation for an Scell when SORTD is adopted according to an exemplary embodiment of the present invention.

Since two pieces of ACK/NACK information for two TB of the Scell are to be fed back, four ACK/NACK channels should be allocated for the two pieces of ACK/NACK information. Denoting the four channels as CH_1, CH_2, CH_3 and CH_4 respectively, CH_1 corresponds to ch_c which is allocated when channel selection is adopted and SORTD is not adopted; CH_2 corresponds to ch_d which is allocated when channel selection is adopted and SORTD is not adopted. The method may include the following procedures.

Referring to FIG. 4, in block 401, when SORTD is adopted, an Scell adopting MIMO is allocated with four ACK/NACK channels, e.g., CH_1, CH_2, CH_3 and CH_4. CH_1 corresponds to ch_c allocated to the Scell when SORTD is not adopted. CH_2 corresponds to ch_d allocated to the Scell when SORTD is not adopted.

In block 401, when cross carrier scheduling is not adopted, or the cross carrier scheduling is realized by using PDCCH of another Scell, the four ACK/NACK channels may be semi-statically configured by a high layer, or, multiple ACK/NACK channels are semi-statically configured by the high layer and four ACK/NACK channels are dynamically specified by ARI information in the PDCCH. When cross carrier scheduling from PDCCH of the Pcell is performed, an implicit method may be adopted to specify the four ACK/NACK channels for ACK/NACK information of the Scell via the PDCCH. The four ACK/NACK channels may all be obtained from the PDCCH. Denoting the smallest CCE index of the PDCCH as n, the four ACK/NACK channels CH_1, CH_2, CH_3 and CH_4 may be obtained by mapping the CCE index n, n+1, n+2 and n+3. Alternatively, two of the four ACK/NACK channels are obtained from the PDCCH. For example, denoting the smallest CCE index of the PDCCH as n, the two ACK/NACK channels may be obtained by mapping the CCE index n and n+1, and are denoted as CH_1 and CH_2. The other two ACK/NACK channels, i.e., CH_3 and CH_4 may be semi-statically configured by a high layer, or multiple ACK/NACK channels are semi-statically configured by the high layer and the two ACK/NACK channels are dynamically indicated by ARI information in the PDCCH. If the current sub-frame of the Scell is configured with an SPS service, the four ACK/NACK channels may be semi-statically configured by the high layer.

In block 402, each antenna uses two of the four ACK/NACK channels for feeding back ACK/NACK information. In the channel selection mapping table which does not adopt SORTD, the two ACK/NACK channels for the Scell are respectively denoted by ch_c and ch_d.

In block 402, assuming that ch_d is used for transmitting ACK/NACK information in situations where a UE only receives data from the Scell or the ACK/NACK information received by the UE from the Pcell are NACKs according to the channel selection mapping table which does not adopt SORTD, ch_d of the two antennas may respectively use CH_1 and CH_2 when SORTD is adopted, e.g., ch_d of antenna 1 uses CH_2, ch_d of antenna 2 uses CH_1. Alternatively, ch_d of antenna 1 uses CH_1 and ch_d of antenna 2 uses CH_2. The two channel allocation manners are equivalent because the BS should receive signals from the two antennas simultaneously. Therefore, when the BS only schedules data in the Scell for the UE, the BS only has to monitor CH_1 and CH_2, and the other two ACK/NACK channels are not occupied and can be used for other purposes. For example, the BS does not have to reserve the ACK/NACK channels corresponding to CCE index n+2 and n+3, thus the scheduling of CCE allocation becomes more flexible. In addition, ch_c of the two antennas respectively uses the other two allocated channels CH_3 and CH_4, e.g., ch_c of antenna 1 uses CH_3 and ch_c of antenna 2 uses CH_4. Alternatively, other manners may also be adopted for allocating the four channels to two antennas when it is not considered to increase the flexibility in CCE allocation or to reduce candidate channels used when the UE only schedules Scell. For example, for antenna 1, ch_c uses CH_1 and ch_d uses CH_2. For antenna 2, ch_c uses CH_3 and ch_d uses CH_4.

In view of the foregoing, an example of a candidate channel resource allocation scheme supporting channel selection and SORTD is shown in Table 2, which assumes Pcell and Scells are all configured with MIMO transmission mode.

TABLE 2 candidate channel resource allocation table supporting channel selection and SORTD transmit diversity

|  |  | channel in the mapping table | candidate channel mapped to |
|---|---|---|---|
| antenna 1 | Pcell | ch_a | CH_1 of Pcell |
|  |  | ch_b | CH_3 of Pcell |
|  | Scell | ch_c | CH_3 of Scell |
|  |  | ch_d | CH_1 of Scell |
| antenna 2 | Pcell | ch_a | CH_2 of Pcell |
|  |  | ch_b | CH_4 of Pcell |
|  | Scell | ch_c | CH_4 of Scell |
|  |  | ch_d | CH_2 of Scell |

In block 402, if the two channels ch_c and ch_d are both used for transmitting ACK/NACK information in situations when a UE only receives data from the Scell and the ACK/

NACK information received by the UE from the Pcell are NACKs according to the channel selection mapping table which does not adopt SORTD, the four channels may be arbitrarily allocated to the two antennas. For example, for antenna 1, ch_c uses CH_1 and ch_d uses CH_2. For antenna 2, ch_c uses CH_3 and ch_d uses CH_4.

The above exemplary embodiments may be used in FDD systems. As for TDD systems, ACK/NACK feedback information for data transmission in multiple downlink sub-frames should be transmitted together within a same uplink sub-frame. The multiple downlink sub-frames whose ACK/NACK information is transmitted in the same uplink sub-frame are referred to as a binding window. The number of downlink sub-frames transmitted in a binding window is referred to as the size of the binding window which is denoted by M. Methods for ACK/NACK channel allocation supporting channel selection and SORTD in a TDD system with respect to the size M of a binding window will be described below.

For a binding window whose size M equals 1, a method the same with that of an FDD system may be adopted for allocating ACK/NACK channel resources when SORTD is adopted. One difference lies in that when the current sub-frame is configured with SPS services, only one ACK/NACK channel should be allocated in the TDD system when SORTD is not adopted regardless of whether the Cell is configured with a MIMO transmission mode, i.e., the ACK/NACK channel semi-statically configured by a high layer for the SPS services. When SORTD is adopted, two ACK/NACK channels should be allocated regardless of whether the Cell is configured with the MIMO transmission mode, and the two channels are both semi-statically configured by the high layer.

When the size M of a binding window in a TDD system is equal to or bigger than 2, the method for ACK/NACK channel resource allocation supporting channel selection according to an exemplary embodiment of the present invention may include configuring, in the system, a mode for a UE feeding back an ACK/NACK to be channel selected with SORTD; allocating, by a BS, downlink resources for the UE in one or multiple cells, and transmitting PDCCH and downlink data via the downlink resources; receiving, by the UE, the PDCCH and the downlink data transmitted by the BS, feeding back ACK/NACK information to the BS based on the channel selection and SORTD; using, by the UE, an ACK/NACK channel identified by a smallest CCE of the PDCCH or an ACK/NACK channel semi-statically configured by a high layer for feeding back ACK/NACK information via a first antenna; using, by the UE, an ACK/NACK channel identified by a second smallest CCE of the PDCCH or an ACK/NACK channel semi-statically configured by the high layer for feeding back ACK/NACK information via a second antenna; receiving, by the BS, the ACK/NACK information fed back by the UE, performing re-transmission or transmitting new data according to the ACK/NACK information.

When the size M of the binding window equals 2, the BS allocates two ACK/NACK channels for each sub-frame in the window. When no SPS service is configured in the sub-frame, the UE uses an ACK/NACK channel identified by the smallest CCE of the PDCCH for feeding back the ACK/NACK information via the first antenna, and uses an ACK/NACK channel identified by a second smallest CCE of the PDCCH for feeding back the ACK/NACK information via the second antenna. When SPS service is configured in the sub-frame, the UE uses two ACK/NACK channels semi-statically configured by the high layer for feeding back the ACK/NACK information via the two antennas.

For example, four candidate channels in a channel selection mapping table are respectively denoted as ch_a, ch_b, ch_c and ch_d, where ch_a and ch_b are for a Pcell, and ch_c and ch_d are for an Scell. When SORTD is not adopted, ch_a of the Pcell corresponds to the first sub-frame in the binding window, and ch_b corresponds to the second sub-frame in the binding window. When a sub-frame does not contain SPS services, the ACK/NACK channel of the sub-frame is decided by the smallest CCE index of the PDCCH. Denoting the smallest CCE index of the PDCCH as n, the ACK/NACK channel to be used may be determined implicitly using the CCE index n. When a sub-frame contains SPS services, the ACK/NACK channel is the SPS ACK/NACK channel semi-statically configured. For the Scell, ch_c corresponds to the first sub-frame in the binding window, and ch_d corresponds to the second sub-frame in the binding window. When cross carrier scheduling is performed, the ACK/NACK channels are all decided by the smallest CCE index. Denoting the smallest CCE index of the PDCCH of the sub-frame as n, the ACK/NACK channels to be used may be determined implicitly using the CCE index n. When non-cross carrier scheduling is performed, two candidate channels are specified among multiple channels semi-statically configured by a high layer using ARI in the PDCCH.

When SORTD is adopted, as shown in Table 3, the method for allocating four candidate ACK/NACK channels to antenna 1 may be the same with that for allocating four channels when SORTD is not adopted, and for antenna 2, four new candidate ACK/NACK channels should be allocated. Specifically, for antenna 2, ch_a of a Pcell corresponds to the first sub-frame in the binding window, and ch_b corresponds to the second sub-frame in the binding window. When a sub-frame does not contain SPS services, the ACK/NACK channel of the sub-frame is decided by the second smallest CCE index of the PDCCH. Denoting the smallest CCE index of the PDCCH as n, the ACK/NACK channel to be used may be determined implicitly using the CCE index n+1. When a sub-frame contains SPS services, the ACK/NACK channel is another ACK/NACK channel semi-statically configured. For the Scell, ch_c corresponds to the first sub-frame in the binding window, and ch_d corresponds to the second sub-frame in the binding window. When cross carrier scheduling is adopted, the ACK/NACK channels are all decided by the second smallest CCE index. Denoting the smallest CCE index of the PDCCH of the sub-frame as n, the ACK/NACK channels to be used may be determined implicitly using the CCE index n+1. When non-cross carrier scheduling is performed, two candidate channels ch_c and ch_d are the other two actually used candidate channels among multiple channels semi-statically configured by a high layer and are specified using ARI in the PDCCH.

The above method for allocating candidate channels to antenna 2 for the Pcell guarantees the regression characteristic. For example, when the BS only schedules data in the Pcell and only schedules data in one sub-frame, the two ACK/NACK channels allocated are the same as those allocated to a UE which is configured with a single Cell and adopts SORTD transmit diversity to avoid state confusion.

TABLE 3 candidate channel resource allocation table supporting channel selection and SORTD transmit diversity when M = 2

| | antenna 1 | | | | antenna 2 | | | |
| --- | --- | --- | --- | --- | --- | --- | --- | --- |
| | Pcell | | Scell | | Pcell | | Scell | |
| | ch_a | ch_b | ch_c | ch_d | ch_a | ch_b | ch_c | ch_d |
| cross carrier scheduling | the smallest CCE, or SPS A/N | the smallest CCE, or SPS A/N | the smallest CCE | the smallest CCE | the second smallest CCE, or SPS A/N | the second smallest CCE, or SPS A/N | the second smallest CCE | the second smallest CCE |
| non-cross carrier scheduling | the smallest CCE, or SPS A/N | the smallest CCE, or SPS A/N | indicated by ARI | indicated by ARI | the second smallest CCE, or SPS A/N | the second smallest CCE, or SPS A/N | indicated by ARI | indicated by ARI |

When the size M of the binding window is 3 or 4, and when no SPS service is configured in the cell, the UE uses two ACK/NACK channels identified by the smallest CCE index of the PDCCH whose a Downlink Assignment Index (DAI) is 1 and the smallest CCE index of the PDCCH whose DAI is 2 for feeding back the ACK/NACK information via the first antenna, and uses two ACK/NACK channels identified by a second smallest CCE index of the PDCCH whose DAI is 1 and a second smallest CCE index of the PDCCH whose DAI is 2 for feeding back the ACK/NACK information via the second antenna.

When the SPS service is configured in the cell, the UE uses an ACK/NACK channel semi-statically configured by the high layer and an ACK/NACK channel identified by the smallest CCE index of the PDCCH whose DAI is 1 for feeding back the ACK/NACK information via the first antenna, and uses another ACK/NACK channel semi-statically configured by the high layer and an ACK/NACK channel identified by a second smallest CCE index of the PDCCH whose DAI is 1 for feeding back the ACK/NACK information via the second antenna.

For example, four candidate channels in a channel selection mapping table are respectively denoted as ch_a, ch_b, ch_c and ch_d, where ch_a and ch_b are for a Pcell, and ch_c and ch_d are for an Scell. When SORTD is not adopted, the ch_a for the Pcell is obtained implicitly from the smallest CCE index n of the PDCCH whose DAI is 1, and ch_b from the smallest CCE index m of the PDCCH whose DAI is 2 when there is no SPS service. When there is an SPS service, ch_a is an ACK/NACK channel of the SPS service semi-statically configured by a high layer, and ch_b is obtained implicitly from the smallest CCE index n of the PDCCH whose DAI is 1. When SORTD is not adopted, ch_c of the Scell is obtained implicitly from the smallest CCE index p of the PDCCH whose DAI is 1, and ch_d from the smallest CCE index q of the PDCCH whose DAI is 2 when cross carrier scheduling is performed. When non cross carrier scheduling is adopted, the two candidate channels ch_c and ch_d are the two actually to-be-used candidate channels among multiple channels semi-statically configured by the high layer and are indicated by an ARI in the PDCCH.

When SORTD is adopted, as shown in Table 4, the method for allocating four candidate ACK/NACK channels to antenna 1 may be the same with that for allocating four channels when SORTD is not adopted, and for antenna 2, four new candidate ACK/NACK channels should be allocated. Specifically, when there is no SPS service, for the Pcell, ch_a of antenna 2 is obtained implicitly from the second smallest CCE index of the PDCCH whose DAI is 1, and the smallest CCE index of the PDCCH is denoted as n, ch_a is determined implicitly using CCE index n+1. Here, ch_b is obtained implicitly from the second smallest CCE index of the PDCCH whose DAI is 2, denoting the smallest CCE index as m, and ch_b is determined implicitly using the CCE index m+1. When there is the SPS service, ch_a of antenna 2 is another ACK/NACK channel semi-statically configured by the high layer for the SPS service, and ch_b is obtained implicitly from the second smallest CCE index of the PDCCH whose DAI is 1, denoting the smallest CCE index of the PDCCH as n, the ch_b is determined using the CCE index n+1. For the Scell, when cross carrier scheduling is adopted, ch_c of antenna 2 is obtained implicitly from the second smallest CCE index of the PDCCH whose DAI is 1, denoting the smallest CCE index of the PDCCH as p, ch_c is determined using the CCE index p+1; ch_d of antenna 2 is obtained implicitly from the second smallest CCE index of the PDCCH whose DAI is 2, denoting the smallest CCE index of the PDCCH is q, and ch_d is determined using the CCE index q+1. When non cross carrier scheduling is adopted, the two candidate channels ch_c and ch_d are another two actually to-be-used candidate channels among multiple channels semi-statically configured by the high layer and are indicated by ARI in the PDCCH.

The above method for allocating candidate channels to antenna 2 for the Pcell guarantees the regression characteristic. For example, when the BS only schedules data in the Pcell and only schedules data in one sub-frame, the two ACK/NACK channels allocated are the same as those allocated to a UE which is configured with a single Cell and adopts SORTD transmit diversity to avoid state confusion.

TABLE 4 candidate channel resource allocation table supporting channel selection and SORTD transmit diversity when M = 3 or 4

| | | antenna 1 | | | | antenna 2 | | | |
| | | Pcell | | Scell | | Pcell | | Scell | |
| | | ch_a | ch_b | ch_c | ch_d | ch_a | ch_b | ch_c | ch_d |
|---|---|---|---|---|---|---|---|---|---|
| cross carrier scheduling | no SPS | CCE n | CCE m | CCE p | CCE q | CCE n + 1 | CCE m + 1 | CCE p + 1 | CCE q + 1 |
| | there is SPS | SPS A/N | CCE n | CCE p | CCE q | SPS A/N | CCE n + 1 | CCE p + 1 | CCE q + 1 |
| non cross carrier scheduling | no SPS | CCE n | CCE m | indicated by ARI | indicated by ARI | CCE n + 1 | CCE m + 1 | indicated by ARI | indicated by ARI |
| | there is SPS | SPS A/N | CCE n | indicated by ARI | indicated by ARI | SPS A/N | CCE n + 1 | indicated by ARI | indicated by ARI |

Figure 5:
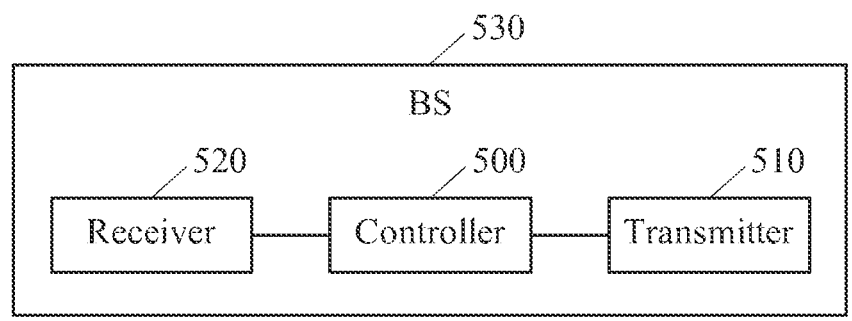
FIG. 5 is a block diagram illustrating a structure of a BS according to an exemplary embodiment of the present invention.

FIG. 5 is a block diagram illustrating a structure of a BS according to an exemplary embodiment of the present invention.

Referring to FIG. 5, the BS 530 includes a controller 500, a transmitter 510 and a receiver 520. The controller 500 controls the transmitter 510 and the receiver 520, and controls all operations of the BS 530. And, the BS 530 performs an ACK/NACK channel allocation method according to an exemplary embodiment of the present invention, in shown the FIGS. 3 and 4.

The transmitter 510 and the receiver 520 perform communication with the UE according to the controls of the controller 500. Specifically, the transmitter 510 transmits PDCCH information and downlink data to the UE, and the receiver 520 receives ACK/NACK information from the UE.

Figure 6:
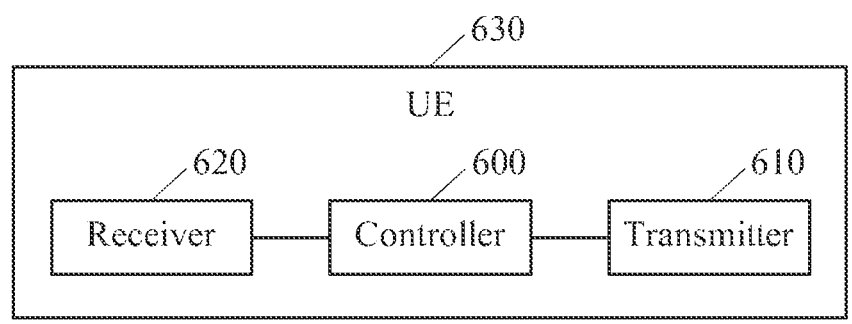
FIG. 6 is a block diagram illustrating a structure of a User Equipment (UE) according to an exemplary embodiment of the present invention.

FIG. 6 is a block diagram illustrating a structure of a UE according to an exemplary embodiment of the present invention.

Referring to FIG. 6, the UE 630 includes a controller 600, a transmitter 610 and a receiver 620. The controller 600 controls the transmitter 610 and the receiver 620, and controls all operations of the UE 630. And, the UE 630 transmits ACK/NACK information according to an exemplary embodiment of the present invention, in shown the FIGS. 3 and 4.

The transmitter 610 and the receiver 620 perform communication with the BS according to the controls of the controller 600. Specifically, the receiver 620 receives PDCCH information and downlink data from the BS, and the transmitter 610 transmits ACK/NACK information to the BS.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for allocating an acknowledgement (ACK)/negative acknowledgement (NACK) channel by a base station (BS) in a frequency division duplexing (FDD) system, the method comprising:
   if a channel selection mode using a spatial orthogonal resource transmit diversity (SORTD) scheme as a mode for ACK/NACK information feedback of a user equipment (UE) is set, allocating downlink resources in one or more cells to the UE;
   transmitting, to the UE, physical downlink control channel (PDCCH) information and downlink data via the downlink resources;
   allocating at least four ACK/NACK channels to the UE;
   receiving ACK/NACK information for the PDCCH information and the downlink data fed back by using two antennas from the UE, via at least one ACK/NACK channel among the four ACK/NACK channels; and
   performing re-transmission or transmitting new data according to the ACK/NACK information,
   wherein at least two of the at least four ACK/NACK channels are the same as at least two ACK/NACK channels allocated by the BS in a mode not using the SORTD scheme, and the at least two of the at least four ACK/NACK channels are allocated to same antennas.

2. The method of claim 1, wherein the at least two of the at least four ACK/NACK channels are determined based on a data transmission scheduling result of the PDCCH in a primary cell (Pcell), and respectively correspond to a smallest control channel element (CCE) index n of the PDCCH and n+1, and
   wherein at least another two of the at least four ACK/NACK channels are one of at least two ACK/NACK channels semi-statically configured by a high layer, and at least two ACK/NACK channels respectively correspond to an ACK/NACK resource indication (ARI) determined according to a data transmission scheduling result of the PDCCH in a secondary cell (Scell), among a plurality of ACK/NACK channels semi-statically configured by the high layer.

3. The method of claim 1, wherein the at least four ACK/NACK channels are determined based on a data transmission scheduling result of the PDCCH in a primary cell (Pcell), and
   wherein the at least two of the at least four ACK/NACK channels respectively correspond to a smallest control channel element (CCE) index n of the PDCCH and n+1, and at least another two of the at least four ACK/NACK channels respectively correspond to n+2 and n+3.

4. The method of claim 1, wherein the at least four ACK/NACK channels are semi-statically configured by a high layer, or
   wherein the at least two of the at least four ACK/NACK channels are semi-statically configured by the high layer, and at least another two of the at least four ACK/NACK channels correspond to an ACK/NACK resource indication (ARI) determined according to a data transmission scheduling result of the PDCCH in a primary cell (Pcell), among a plurality of ACK/NACK channels semi-statically configured by the high layer.

5. The method of claim 1, wherein the at least two of the at least four ACK/NACK channels are used respectively by the two antennas, and wherein the at least two of the at least four ACK/NACK channels are selected based on a channel selection mapping table which does not adopt the SORTD scheme for each antenna, if the UE only receives data in a primary cell (Pcell) or ACK/NACK information received from the UE in a secondary cell (Scell) are NACKs.

6. The method of claim 1, wherein the at least four ACK/NACK channels are semi-statically configured by a high layer, or
wherein the at least four ACK/NACK channels respectively correspond to an ACK/NACK resource indication (ARI) determined according to a data transmission scheduling result of the PDCCH in a secondary cell (Scell), among a plurality of ACK/NACK channels semi-statically configured by the high layer, or
wherein the at least four ACK/NACK channels are determined based on a data transmission scheduling result of the PDCCH in a primary cell (Pcell), wherein the at least two of the at least four ACK/NACK channels respectively correspond to a smallest control channel element (CCE) index n of the PDCCH and n+1, and at least another two of the at least four ACK/NACK channels respectively correspond to n+2 and n+3, or
wherein the at least two of the at least four ACK/NACK channels are determined based on a data transmission scheduling result of the PDCCH in the Pcell, and respectively correspond to the CCE index n and n+1, and at least another two of the at least four ACK/NACK channels respectively correspond to the ARI determined according to in the data transmission scheduling result of the PDCCH in the Scell, among the plurality of ACK/NACK channels.

7. A method for allocating an acknowledgement (ACK)/negative acknowledgement (NACK) channel by a base station (BS) in a time division duplexing (TDD) system, the method comprising:
if a channel selection mode using a spatial orthogonal resource transmit diversity (SORTD) scheme as a mode for ACK/NACK information feedback of a user equipment (UE) is set, allocating downlink resources in one or multiple cells to the UE;
transmitting, to the UE, physical downlink control channel (PDCCH) information and downlink data via the downlink resources;
allocating at least two ACK/NACK channels to the UE; and
receiving ACK/NACK information fed back from the UE via at least one ACK/NACK channel among four ACK/NACK channels, and performing re-transmission or transmitting new data according to the ACK/NACK information,
wherein a first ACK/NACK channel of the at least two ACK/NACK channels is one of an ACK/NACK channel identified by a smallest control channel element (CCE) index of the PDCCH of the UE, and an ACK/NACK channel semi-statically configured by a high layer for feeding back the ACK/NACK information via the first antenna, and
wherein a second ACK/NACK channel of the at least two ACK/NACK channels is one of an ACK/NACK channel identified by a second smallest CCE of the PDCCH of the UE, and an ACK/NACK channel semi-statically configured by the high layer for feeding back the ACK/NACK information via the second antenna.

8. The method of claim 7, wherein multiple downlink sub-frames for the ACK/NACK information transmitted in a same uplink sub-frame forms a binding window, and a number of downlink sub-frames transmitted in the binding window is a size M of the binding window,
if the size M of the binding window is 2, the first and the second ACK/NACK channels are allocated for each sub-frame in the binding window,
if a type of a service for physical channel resources is not determined in the sub-frames, the ACK/NACK channel identified by the smallest CCE index of the PDCCH for feeding back the ACK/NACK information via the first antenna, and the ACK/NACK channel identified by the second smallest CCE index of the PDCCH for feeding back the ACK/NACK information via the second antenna, are used by the UE, and
if the type of the service for the physical channel resources is determined in the sub-frames, the ACK/NACK channel semi-statically configured by the high layer for feeding back the ACK/NACK information via the first antennas, and the ACK/NACK channel semi-statically configured by the high layer for feeding back the ACK/NACK information via the second antenna, are used by the UE.

9. The method of claim 7, wherein multiple downlink sub-frames for the ACK/NACK information transmitted in a same uplink sub-frame forms a binding window, and a number of downlink sub-frames transmitted in the binding window is a size M of the binding window,
if the size M of the binding window is 3 or 4,
if a type of a service for physical channel resources is not determined in the cell, two ACK/NACK channels identified respectively by the smallest CCE index of a PDCCH whose downlink assignment index (DAI) is 1 and by the smallest CCE index of a PDCCH whose DAI is 2 for feeding back the ACK/NACK information via the first antenna, and two ACK/NACK channels identified respectively by the second smallest CCE index of the PDCCH whose DAI is 1 and by the second smallest CCE index of the PDCCH whose DAI is 2 for feeding back the ACK/NACK information via the second antenna, are used by the UE, and
if the type of the service for the physical channel resources is determined in the cell, an ACK/NACK channel semi-statically configured by the high layer and an ACK/NACK channel identified by the smallest CCE index of the PDCCH whose DAI is 1 for feeding back the ACK/NACK information via the first antenna, and another ACK/NACK channel semi-statically configured by the high layer and an ACK/NACK channel identified by a second smallest CCE index of the PDCCH whose DAI is 1 for feeding back the ACK/NACK information via the second antenna, are used by the UE.

10. A method for transmitting acknowledgement (ACK)/negative acknowledgement (NACK) information by a user equipment (UE) in a frequency division duplexing (FDD) system, the method comprising:
if a channel selection mode using a spatial orthogonal resource transmit diversity (SORTD) scheme as a mode for ACK/NACK information feedback of a UE is set, receiving an allocation of downlink resources in one or more cells from a base station (BS);
receiving physical downlink control channel (PDCCH) information and downlink data from the BS via the downlink resources;
receiving an allocation of at least four ACK/NACK channels from the BS; and
transmitting, to the BS, the ACK/NACK information for the PDCCH information and the downlink data by using two antennas via at least one ACK/NACK channel among the four ACK/NACK channels,
wherein at least two of the at least four ACK/NACK channels are the same as at least two ACK/NACK channels allocated by the BS in a mode not using the SORTD scheme, and the at least two of the at least four ACK/NACK channels are allocated to same antennas.

11. The method of claim 10, wherein the at least two of the at least four ACK/NACK channels are determined based on a data transmission scheduling result of the PDCCH in a primary cell (Pcell), and respectively correspond to a smallest control channel element (CCE) index n of the PDCCH and n+1, and
wherein at least another two of the at least four ACK/NACK channels are one of at least two ACK/NACK channels semi-statically configured by a high layer, and at least two ACK/NACK channels respectively correspond to an ACK/NACK resource indication (ARI) determined according to a data transmission scheduling result of the PDCCH in a secondary cell (Scell), among a plurality of ACK/NACK channels semi-statically configured by the high layer.

12. The method of claim 10, wherein the at least four ACK/NACK channels are determined based on a data transmission scheduling result of the PDCCH in a primary cell (Pcell), and
wherein the at least two of the at least four ACK/NACK channels respectively correspond to a smallest control channel element (CCE) index n of the PDCCH and n+1, and at least another two of the at least four ACK/NACK channels respectively correspond to n+2 and n+3.

13. The method of claim 10, wherein the at least four ACK/NACK channels are semi-statically configured by a high layer, or
wherein the at least two of the at least four ACK/NACK channels are semi-statically configured by the high layer, and at least another two of the at least four ACK/NACK channels correspond to an ACK/NACK resource indication (ARI) determined according to a data transmission scheduling result of the PDCCH in a primary cell (Pcell), among a plurality of ACK/NACK channels semi-statically configured by the high layer.

14. The method of claim 10, wherein the at least two of the at least four ACK/NACK channels are used respectively by the two antennas, and
wherein the at least two of the at least four ACK/NACK channels are selected based on a channel selection mapping table which does not adopt the SORTD scheme for each antenna, if the UE only receives data in a primary cell (Pcell) or ACK/NACK information received from the UE in a secondary cell (Scell) are NACKs.

15. The method of claim 10, wherein the at least four ACK/NACK channels are semi-statically configured by a high layer, or
wherein the at least four ACK/NACK channels respectively correspond to an ACK/NACK resource indication (ARI) determined according to a data transmission scheduling result of the PDCCH in a secondary cell (Scell), among a plurality of ACK/NACK channels semi-statically configured by the high layer, or
wherein the at least four ACK/NACK channels are determined based on a data transmission scheduling result of the PDCCH in a primary cell (Pcell), wherein the at least two of the at least four ACK/NACK channels respectively correspond to a smallest control channel element (CCE) index n of the PDCCH and n+1, and at least another two of the at least four ACK/NACK channels respectively correspond to n+2 and n+3, or
wherein the at least two of the at least four ACK/NACK channels are determined based on a data transmission scheduling result of the PDCCH in the Pcell, and respectively correspond to the CCE index n and n+1, the at least another two of the at least four ACK/NACK channels respectively correspond to the ARI determined according to in the data transmission scheduling result of the PDCCH in the Scell, among the plurality of ACK/NACK channels.

16. A method for transmitting an acknowledgement (ACK)/negative acknowledgement (NACK) information by a user equipment (UE) in a time division duplexing (TDD) system, the method comprising:
if a channel selection mode using a spatial orthogonal resource transmit diversity (SORTD) scheme as a mode for ACK/NACK information feedback of a UE is set, receiving an allocation of downlink resources in one or multiple cells from a base station (BS);
receiving, from the BS, physical downlink control channel (PDCCH) information and downlink data via the downlink resources;
receiving an allocation of at least two ACK/NACK channels from the BS; and
transmitting ACK/NACK information to the BS via at least one ACK/NACK channel among four ACK/N ACK channels,
wherein a first ACK/NACK channel of the at least two ACK/NACK channels is one of an ACK/NACK channel identified by a smallest control channel element (CCE) index of the PDCCH of the UE, and an ACK/NACK channel semi-statically configured by a high layer for feeding back the ACK/NACK information via the first antenna, and
wherein a second ACK/NACK channel of the at least two ACK/NACK channels is one of an ACK/NACK channel identified by a second smallest CCE index of the PDCCH via a second antenna of the UE, and an ACK/NACK channel semi-statically configured by the high layer for feeding back the ACK/NACK information via the second antenna.

17. The method of claim 16, wherein multiple downlink sub-frames for the ACK/NACK information transmitted in a same uplink sub-frame forms a binding window, and a number of downlink sub-frames transmitted in the binding window is a size M of the binding window,
if the size M of the binding window is 2, the first and the second ACK/NACK channels are allocated for each sub-frame in the binding window,
if a type of a service for physical channel resources is not determined in the sub-frames, the ACK/NACK channel identified by the smallest CCE index of the PDCCH for feeding back the ACK/NACK information via the first antenna, and the ACK/NACK channel identified by the second smallest CCE index of the PDCCH for feeding back the ACK/NACK information via the second antenna, are used by the UE, and
if the type of the service for the physical channel resources is determined in the sub-frames, the ACK/NACK channel semi-statically configured by the high layer for feeding back the ACK/NACK information via the first antennas, and the ACK/NACK channel semi-statically configured by the high layer for feeding back the ACK/NACK information via the second antenna, are used by the UE.

18. The method of claim 16, wherein multiple downlink sub-frames for the ACK/NACK information transmitted in a same uplink sub-frame forms a binding window, and a number of downlink sub-frames transmitted in the binding window is a size M of the binding window, if the size M of the binding window is 3 or 4,
if a type of a service for physical channel resources is not determined in the cell, two ACK/NACK channels identified respectively by the smallest CCE index of a PDCCH whose downlink assignment index (DAI) is 1 and by the smallest CCE index of a PDCCH whose DAI is 2 for feeding back the ACK/NACK information via the first antenna, and two ACK/NACK channels identified respectively by the second smallest CCE index of the PDCCH whose DAI is 1 and by the second smallest CCE index of the PDCCH whose DAI is 2 for feeding back the ACK/NACK information via the second antenna, are used by the UE, and
if the type of the service for the physical channel resources is determined in the cell, an ACK/NACK channel semi-statically configured by the high layer and an ACK/NACK channel identified by the smallest CCE index of the PDCCH whose DAI is 1 for feeding back the ACK/NACK information via the first antenna, and another ACK/NACK channel semi-statically configured by the high layer and an ACK/NACK channel identified by a second smallest CCE index of the PDCCH whose DAI is 1 for feeding back the ACK/NACK information via the second antenna, are used by the UE.

19. A base station (BS) for allocating an acknowledgement (ACK)/negative acknowledgement (NACK) channel in a frequency division duplexing (FDD) system, the BS comprising:
a transmitter;
a receiver; and
a controller, if a channel selection mode using a spatial orthogonal resource transmit diversity (SORTD) scheme as a mode for ACK/NACK information feedback of a user equipment (UE) is set, for allocating downlink resources in one or more cells to the UE, for controlling the transmitter to transmit, to the UE, physical downlink control channel (PDCCH) information and downlink data via the downlink resources, for allocating at least four ACK/NACK channels to the UE, for controlling the receiver to receive ACK/NACK information for the PDCCH information and the downlink data fed back by using two antennas from the UE, via at least one ACK/NACK channel among the four ACK/NACK channels, and for controlling the transmitter to re-transmit or transmit new data according to the ACK/NACK information,
wherein at least two of the at least four ACK/NACK channels are the same as at least two ACK/NACK channels allocated by the BS in a mode not using the SORTD scheme, and the at least two of the at least four ACK/NACK channels are allocated to same antennas.

20. The BS of claim 19, wherein the at least two of the at least four ACK/NACK channels are determined based on a data transmission scheduling result of the PDCCH in a primary cell (Pcell), and respectively correspond to a smallest control channel element (CCE) index n of the PDCCH and n+1, and
wherein at least another two of the at least four ACK/NACK channels are one of at least two ACK/NACK channels semi-statically configured by a high layer, and at least two ACK/NACK channels respectively correspond to an ACK/NACK resource indication (ARI) determined according to a data transmission scheduling result of the PDCCH in a secondary cell (Scell), among a plurality of ACK/NACK channels semi-statically configured by the high layer.

21. The BS of claim 19, wherein the at least four ACK/NACK channels are determined based on a data transmission scheduling result of the PDCCH in a primary cell (Pcell), and
wherein the at least two of the at least four ACK/NACK channels respectively correspond to a smallest control channel element (CCE) index n of the PDCCH and n+1, and at least another two of the at least four ACK/NACK channels respectively correspond to n+2 and n+3.

22. The BS of claim 19, wherein the at least four ACK/NACK channels are semi-statically configured by a high layer, or
wherein the at least two of the at least four ACK/NACK channels are semi-statically configured by the high layer, and at least another two of the at least four ACK/NACK channels correspond to an ACK/NACK resource indication (ARI) determined according to a data transmission scheduling result of the PDCCH in a primary cell (Pcell), among a plurality of ACK/NACK channels semi-statically configured by the high layer.

23. The BS of claim 19, wherein the at least two of the at least four ACK/NACK channels are used respectively by the two antennas, and
wherein the at least two of the at least four ACK/NACK channels are selected based on a channel selection mapping table which does not adopt the SORTD scheme for each antenna, if the UE only receives data in a primary cell (Pcell) or ACK/NACK information received from the UE in a secondary cell (Scell) are NACKs.

24. The BS of claim 19, wherein the at least four ACK/NACK channels are semi-statically configured by a high layer, or
wherein the at least four ACK/NACK channels respectively correspond to an ACK/NACK resource indication (ARI) determined according to a data transmission scheduling result of the PDCCH in a secondary cell (Scell), among a plurality of ACK/NACK channels semi-statically configured by the high layer, or
wherein the at least four ACK/NACK channels are determined based on a data transmission scheduling result of the PDCCH in a primary cell (Pcell), wherein the at least two of the at least four ACK/NACK channels respectively correspond to a smallest control channel element (CCE) index n of the PDCCH and n+1, and at least another two of the at least four ACK/NACK channels respectively correspond to n+2 and n+3, or
wherein the at least two of the at least four ACK/NACK channels are determined based on a data transmission scheduling result of the PDCCH in the Pcell, and respectively correspond to the CCE index n and n+1, and at least another two of the at least four ACK/NACK channels respectively correspond to the ARI determined according to in the data transmission scheduling result of the PDCCH in the Scell, among the plurality of ACK/NACK channels.

25. A base station (BS) for allocating an acknowledgement (ACK)/negative acknowledgement (NACK) channel in a time division duplexing (TDD) system, the BS comprising:
a transmitter;
a receiver;
a controller, if a channel selection mode using a spatial orthogonal resource transmit diversity (SORTD) scheme as a mode for ACK/NACK information feedback of a user equipment (UE) is set, for allocating downlink resources in one or multiple cells to the UE, for controlling the transmitter to transmit, to the UE, physical downlink control channel (PDCCH) information and downlink data via the downlink resources, for allocating at least two ACK/NACK channels to the UE, and for controlling the receiver to receive ACK/NACK information fed back from the UE via at least one ACK/NACK channel among four ACK/NACK channels, and for controlling the transmitter to re-transmit or transmit new data according to the ACK/NACK information, wherein a first ACK/NACK channel of the at least two ACK/NACK channels is one of an ACK/NACK channel identified by a smallest control channel element (CCE) index of the PDCCH of the UE, and an ACK/NACK channel semi-statically configured by a high layer for feeding back the ACK/NACK information via the first antenna, and wherein a second ACK/NACK channel of the at least two ACK/NACK channels is one of an ACK/NACK channel identified by a second smallest CCE of the PDCCH of the UE, and an ACK/NACK channel semi-statically configured by the high layer for feeding back the ACK/NACK information via the second antenna.

26. The BS of claim 25, wherein multiple downlink sub-frames for the ACK/NACK information transmitted in a same uplink sub-frame forms a binding window, and a number of downlink sub-frames transmitted in the binding window is a size M of the binding window, if the size M of the binding window is 2, the first and the second ACK/NACK channels are allocated for each sub-frame in the binding window, if a type of a service for physical channel resources is not determined in the sub-frames, the ACK/NACK channel identified by the smallest CCE index of the PDCCH for feeding back the ACK/NACK information via the first antenna, and the ACK/NACK channel identified by the second smallest CCE index of the PDCCH for feeding back the ACK/NACK information via the second antenna, are used by the UE, and if the type of the service for the physical channel resources is determined in the sub-frames, the ACK/NACK channel semi-statically configured by the high layer for feeding back the ACK/NACK information via the first antennas, and the ACK/NACK channel semi-statically configured by the high layer for feeding back the ACK/NACK information via the second antenna, are used by the UE.

27. The BS of claim 25, wherein multiple downlink sub-frames for the ACK/NACK information transmitted in a same uplink sub-frame forms a binding window, and a number of downlink sub-frames transmitted in the binding window is a size M of the binding window, if the size M of the binding window is 3 or 4, if a type of a service for physical channel resources is not determined in the cell, two ACK/NACK channels identified respectively by the smallest CCE index of a PDCCH whose downlink assignment index (DAI) is 1 and by the smallest CCE index of a PDCCH whose the DAI is 2 for feeding back the ACK/NACK information via the first antenna, and two ACK/NACK channels identified respectively by the second smallest CCE index of the PDCCH whose DAI is 1 and by the second smallest CCE index of the PDCCH whose DAI is 2 for feeding back the ACK/NACK information via the second antenna, are used by the UE, and if the type of the service for the physical channel resources is determined in the cell, an ACK/NACK channel semi-statically configured by the high layer and an ACK/NACK channel identified by the smallest CCE index of the PDCCH whose DAI is 1 for feeding back the ACK/NACK information via the first antenna, and another ACK/NACK channel semi-statically configured by the high layer and an ACK/NACK channel identified by a second smallest CCE index of the PDCCH whose DAI is 1 for feeding back the ACK/NACK information via the second antenna, are used by the UE.

28. A user equipment (UE) for transmitting acknowledgement (ACK)/negative acknowledgement (NACK) information in a frequency division duplexing (FDD) system, the UE comprising:

a transmitter;
a receiver; and
a controller, if a channel selection mode using a spatial orthogonal resource transmit diversity (SORTD) scheme as a mode for ACK/NACK information feedback of a UE is set, for controlling the receiver to receive an allocation of downlink resources in one or more cells from a base station (BS), to receive physical downlink control channel (PDCCH) information and downlink data from the BS via the downlink resources and to receive an allocation of at least four ACK/NACK channels from the BS, and for controlling to the transmitter to transmit, to the BS, the ACK/NACK information for the PDCCH information and the downlink data by using two antennas via at least one ACK/NACK channel among the four ACK/NACK channels, wherein at least two of the at least four ACK/NACK channels are the same as at least two ACK/NACK channels allocated by the BS in a mode not using the SORTD scheme, and the at least two of the at least four ACK/NACK channels are allocated to same antennas.

29. The UE of claim 28, wherein the at least two of the at least four ACK/NACK channels are determined based on a data transmission scheduling result of the PDCCH in a primary cell (Pcell), and respectively correspond to a smallest control channel element (CCE) index n of the PDCCH and n+1, and wherein at least another two of the at least four ACK/NACK channels are one of at least two ACK/NACK channels semi-statically configured by a high layer, and at least two ACK/NACK channels respectively correspond to an ACK/NACK resource indication (ARI) determined according to a data transmission scheduling result of the PDCCH in a secondary cell (Scell), among a plurality of ACK/NACK channels semi-statically configured by the high layer.

30. The UE of claim 28, wherein the at least four ACK/NACK channels are determined based on a data transmission scheduling result of the PDCCH in a primary cell (Pcell), and wherein the at least two of the at least four ACK/NACK channels respectively correspond to a smallest control channel element (CCE) index n of the PDCCH and n+1, and at least another two of the at least four ACK/NACK channels respectively correspond to n+2 and n+3.

31. The UE of claim 28, wherein the at least four ACK/NACK channels are semi-statically configured by a high layer, or wherein the at least two of the at least four ACK/NACK channels are semi-statically configured by the high layer, and at least another two of the at least four ACK/NACK channels correspond to an ACK/NACK resource indication (ARI) determined according to a data transmission scheduling result of the PDCCH in a primary cell (Pcell), among a plurality of ACK/NACK channels semi-statically configured by the high layer.

32. The method of claim 28, wherein the at least two of the at least four ACK/NACK channels are used respectively by the two antennas, and
wherein the at least two of the at least four ACK/NACK channels are selected based on a channel selection mapping table which does not adopt the SORTD scheme for each antenna, if the UE only receives data in a primary cell (Pcell) or ACK/NACK information received from the UE in a secondary cell (Scell) are NACKs.

33. The UE of claim 28, wherein the at least four ACK/NACK channels are semi-statically configured by a high layer, or
wherein the at least four ACK/NACK channels respectively correspond to an ACK/NACK resource indication (ARI) determined according to a data transmission scheduling result of the PDCCH in a secondary cell (Scell), among a plurality of ACK/NACK channels semi-statically configured by the high layer, or
wherein the at least four ACK/NACK channels are determined based on a data transmission scheduling result of the PDCCH in a primary cell (Pcell), wherein the at least two of the at least four ACK/NACK channels respectively correspond to a smallest control channel element (CCE) index n of the PDCCH and n+1, and at least another two of the at least four ACK/NACK channels respectively correspond to n+2 and n+3, or
wherein the at least two of the at least four ACK/NACK channels are determined based on a data transmission scheduling result of the PDCCH in the Pcell, and respectively correspond to the CCE index n and n+1, the at least another two of the at least four ACK/NACK channels respectively correspond to the ARI determined according to in the data transmission scheduling result of the PDCCH in the Scell, among the plurality of ACK/NACK channels.

34. A user equipment (UE) for transmitting acknowledgement (ACK)/negative acknowledgement (NACK) information in a time division duplexing (TDD) system, the UE comprising:
a transmitter;
a receiver; and
a controller, if a channel selection mode using a spatial orthogonal resource transmit diversity (SORTD) scheme as a mode for ACK/NACK information feedback of a UE is set, for controlling the receiver to receive an allocation of downlink resources in one or multiple cells from a base station (BS), to receiving, from the BS, physical downlink control channel (PDCCH) information and downlink data via the downlink resources and to receive an allocation of at least one ACK/NACK channel among four ACK/NACK channels from the BS, and for controlling the transmitter to transmit ACK/NACK information to the BS via the at least one ACK/NACK channel among the four ACK/NACK channels.
wherein a first ACK/NACK channel of the at least two ACK/NACK channels is one of an ACK/NACK channel identified by a smallest control channel element (CCE) index of the PDCCH of the UE, and an ACK/NACK channel semi-statically configured by a high layer for feeding back the ACK/NACK information via the first antenna, and
wherein a second ACK/NACK channel of the at least two ACK/NACK channels is one of an ACK/NACK channel identified by a second smallest CCE index of the PDCCH via a second antenna of the UE, and an ACK/NACK channel semi-statically configured by the high layer for feeding back the ACK/NACK information via the second antenna.

35. The UE of claim 34, wherein multiple downlink sub-frames for the ACK/NACK information transmitted in a same uplink sub-frame forms a binding window, and a number of downlink sub-frames transmitted in the binding window is a size M of the binding window,
if the size M of the binding window is 2, the first and the second ACK/NACK channels are allocated for each sub-frame in the binding window,
if a type of a service for physical channel resources is not determined in the sub-frames, the ACK/NACK channel identified by the smallest CCE index of the PDCCH for feeding back the ACK/NACK information via the first antenna, and the ACK/NACK channel identified by the second smallest CCE index of the PDCCH for feeding back the ACK/NACK information via the second antenna, are used by the UE, and
if the type of the service for the physical channel resources is determined in the sub-frames, the ACK/NACK channel semi-statically configured by the high layer for feeding back the ACK/NACK information via the first antennas, and the ACK/NACK channel semi-statically configured by the high layer for feeding back the ACK/NACK information via the second antenna, are used by the UE.

36. The UE of claim 34, wherein multiple downlink sub-frames for the ACK/NACK information transmitted in a same uplink sub-frame forms a binding window, and a number of downlink sub-frames transmitted in the binding window is a size M of the binding window,
if the size M of the binding window is 3 or 4,
if a type of a service for physical channel resources is not determined in the cell, two ACK/NACK channels identified respectively by the smallest CCE index of a PDCCH whose downlink assignment index (DAI) is 1 and by the smallest CCE index of a PDCCH whose DAI is 2 for feeding back the ACK/NACK information via the first antenna, and two ACK/NACK channels identified respectively by the second smallest CCE index of the PDCCH whose DAI is 1 and by the second smallest CCE index of the PDCCH whose DAI is 2 for feeding back the ACK/NACK information via the second antenna, are used by the UE, and
if the type of the service for the physical channel resources is determined in the cell, an ACK/NACK channel semi-statically configured by the high layer and an ACK/NACK channel identified by the smallest CCE index of the PDCCH whose DAI is 1 for feeding back the ACK/NACK information via the first antenna, and another ACK/NACK channel semi-statically configured by the high layer and an ACK/NACK channel identified by a second smallest CCE index of the PDCCH whose DAI is 1 for feeding back the ACK/NACK information via the second antenna, are used by the UE.

* * * * *